United States Patent [19]

Levy et al.

[11] 4,308,618
[45] Dec. 29, 1981

[54] METHOD OF COMPENSATING PHASE NOISE AT THE RECEIVER END OF A DATA TRANSMISSION SYSTEM

[75] Inventors: Michel Levy, Massy; Christian Poinas, Boulogne, both of France

[73] Assignee: Compagnie Industrielle des Telecommunications Cit-Alcatel, Paris, France

[21] Appl. No.: 144,099

[22] Filed: Apr. 28, 1980

[30] Foreign Application Priority Data

Apr. 27, 1979 [FR] France ............................. 79 10807

[51] Int. Cl.$^3$ ..................... H03H 15/02; H03K 5/159
[52] U.S. Cl. .................................. 375/15; 375/39;
 375/99; 329/104; 333/18; 328/164
[58] Field of Search ................ 328/162, 166; 329/104,
 329/133; 333/18; 364/480, 574, 724; 370/6, 21;
 375/12, 15, 39, 99, 101, 102; 455/296, 305

[56] References Cited

U.S. PATENT DOCUMENTS

| | | | |
|---|---|---|---|
| 3,868,603 | 2/1975 | Guidoux | 375/15 |
| 3,971,996 | 7/1976 | Motley | 375/39 |
| 3,974,449 | 8/1976 | Falconer | 375/14 |
| 4,053,837 | 10/1977 | Ryan et al. | 375/15 |
| 4,091,331 | 5/1978 | Kaser et al. | 329/110 |

FOREIGN PATENT DOCUMENTS 2296315  7/1976  France .
2354003  12/1977  France .
2408949  6/1979  France .

OTHER PUBLICATIONS

"National Telecommunications Conference" Nov. 29, 30, Dec. 1, and 1975, N.Y., N.Y. Levy—Auto Adaptive Equalizer . . . , pp. 45.2-1 to 45.2-3.
IEEE International Conference on Communications: Jun. 11-13, 1973, N.Y., N.Y., Gibson "Coherent SSBSC Reception . . . ", pp. 2-31-35.

*Primary Examiner*—Benedict V. Safourek
*Attorney, Agent, or Firm*—Sughrue, Mion, Zinn, Macpeak and Seas

[57] ABSTRACT

Data in the form of multi-value symbols is transmitted at a symbol rate $1/\Delta T$. At the receiver a decision circuit supplies estimates of the transmitted symbols on the basis of the received symbols. The present invention concerns compensating phase noise after equalization if any of the received symbols and before application of the received symbols to the decision circuit (38, 39). The received symbols are in complex form with in-phase and quadrature components $y_k'$ and $y_k''$ respectively. Phase noise is compensated by complex multiplication in a multiplier (36) of the received symbols by a complex coefficient.

The invention is particularly applicable to quadrature modulation systems, but if only one channel is transmitted the quadrature channel can be simulated using the Hilbert transform of the one channel.

6 Claims, 5 Drawing Figures

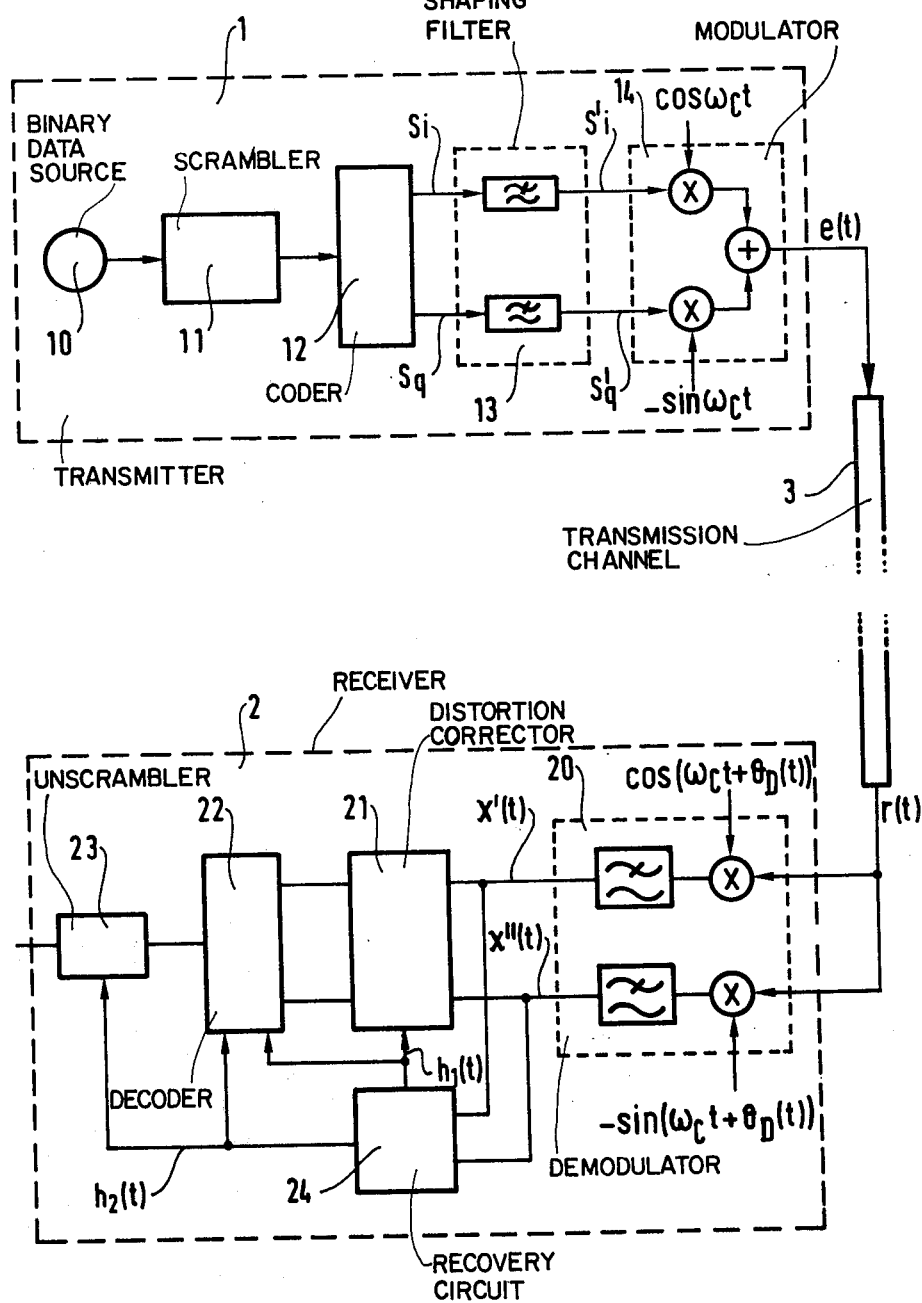

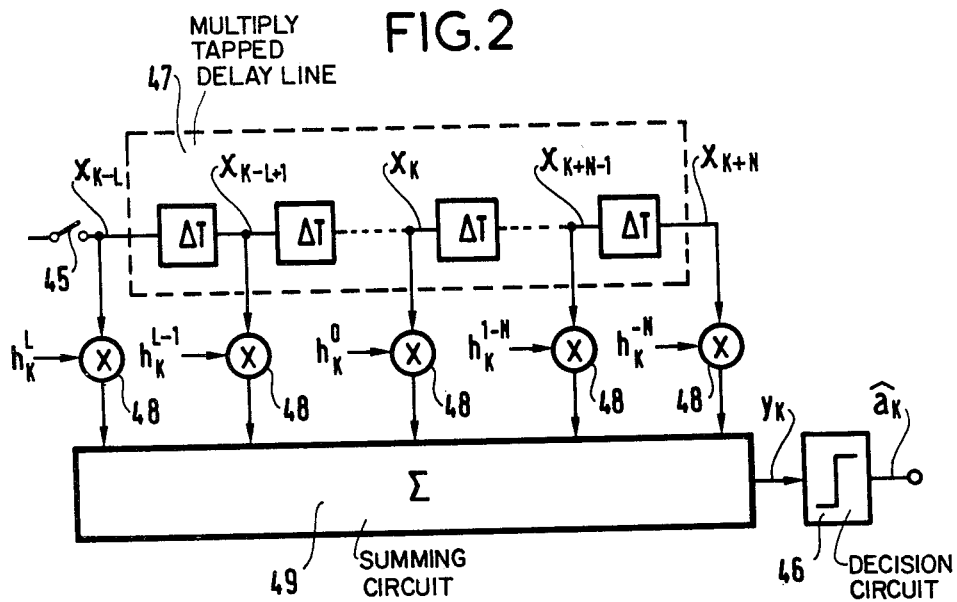
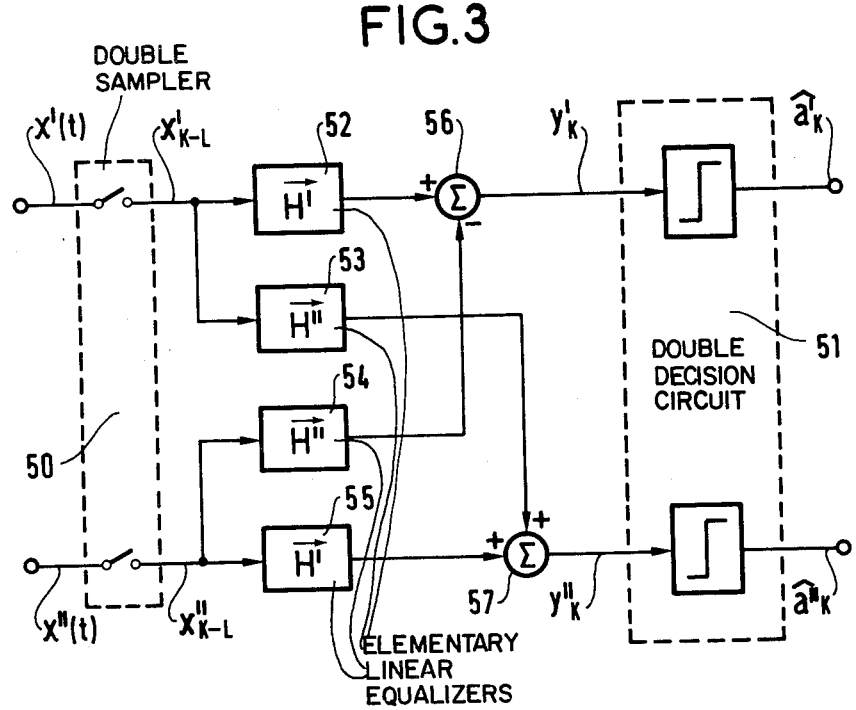

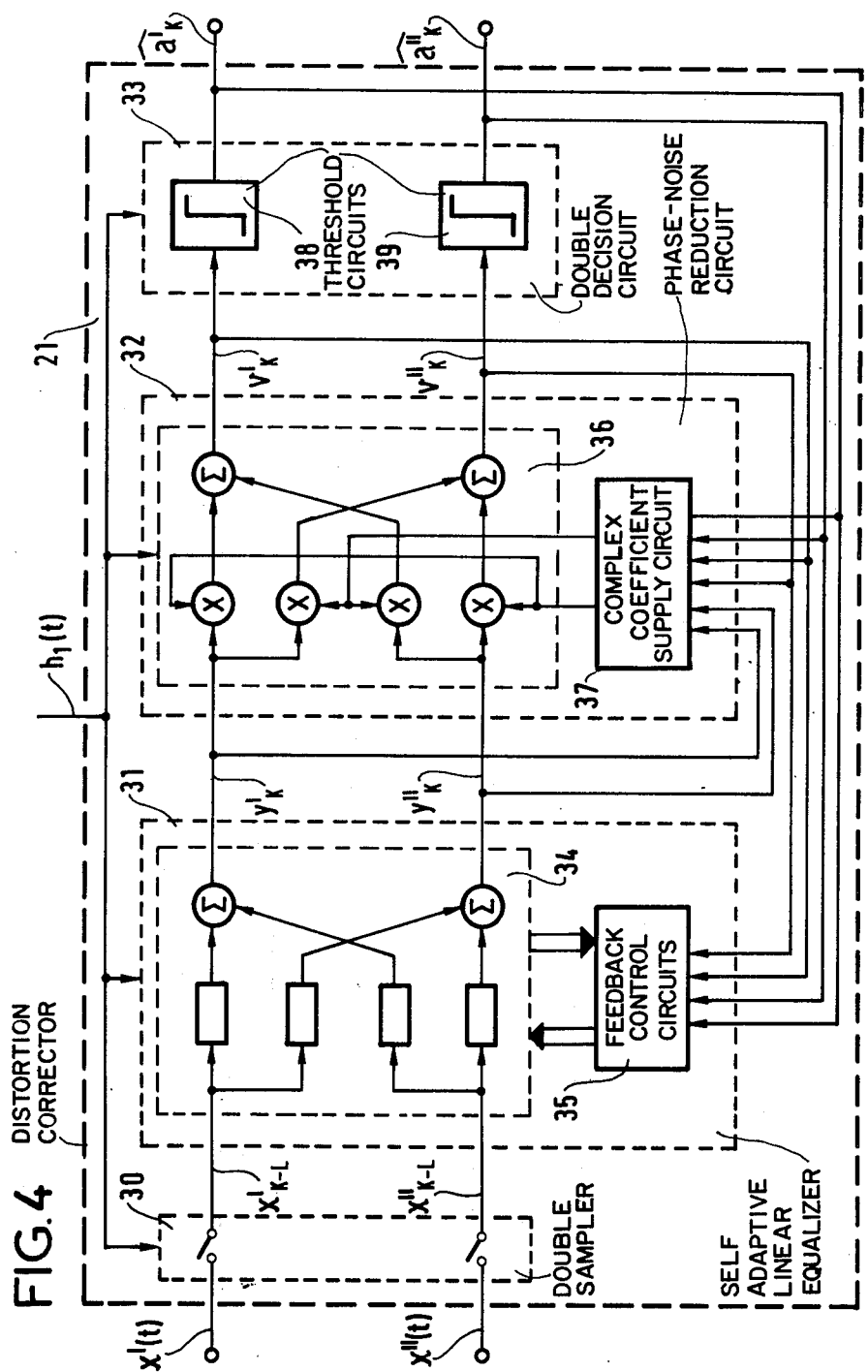

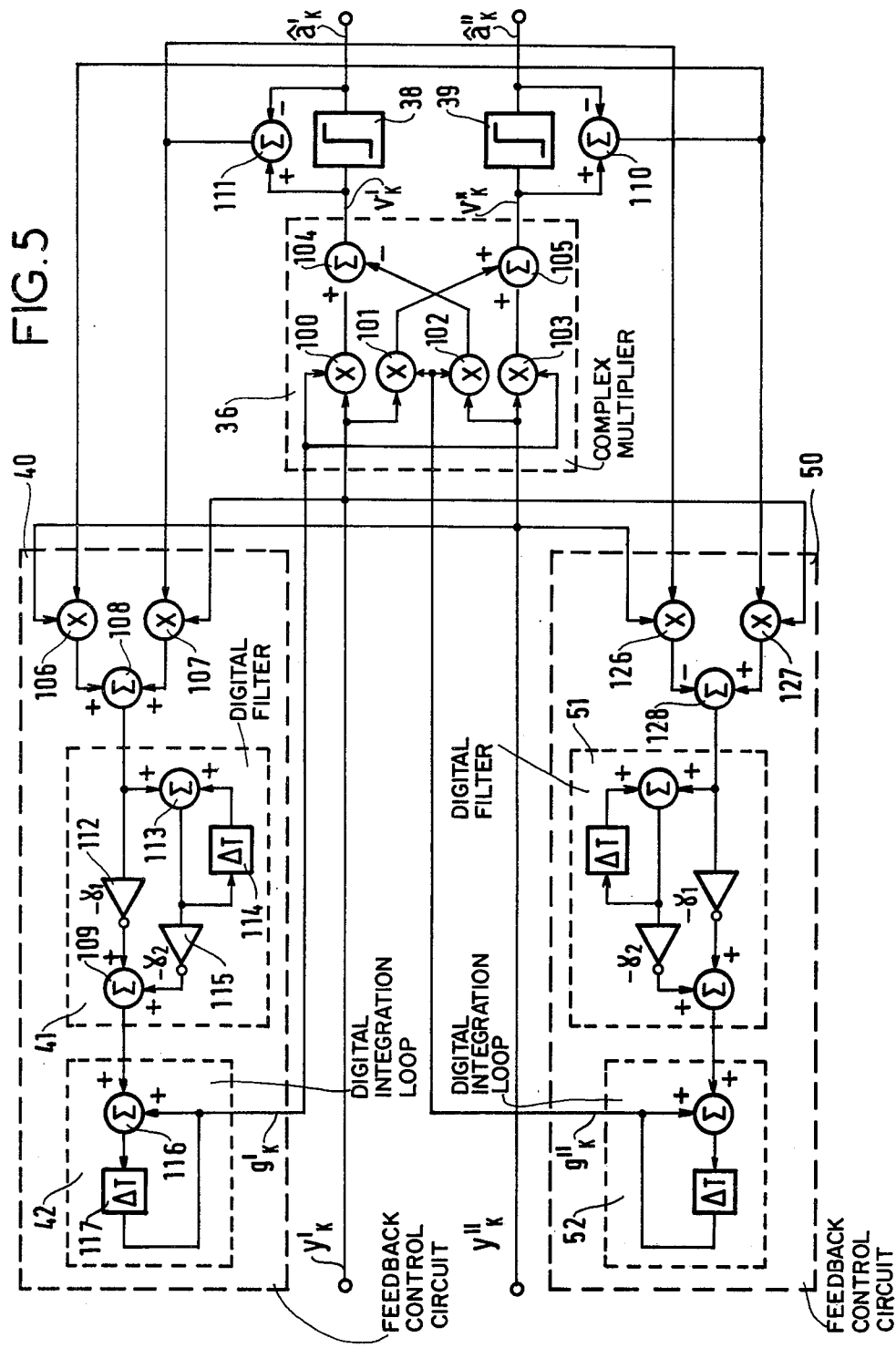

METHOD OF COMPENSATING PHASE NOISE AT THE RECEIVER END OF A DATA TRANSMISSION SYSTEM

The present invention relates to synchronous data transmission via a band-limited transmission channel, and concerns the elimination of distortion which gives rise to errors at the receiver end in estimating the symbols originally transmitted and thereby limits the binary transmission rate.

BACKGROUND OF THE INVENTION

H. Nyquist has shown that the rate of transmission through an ideal low-pass network cannot exceed two data pulses per hertz of passband, and that this theoretical limit can be approached by a transmission channel whose overall behaviour for data pulses is analogous to that of a gradual cut-off low-pass filter having a linear phase characteristic. That is why when seeking to provide data transmission at a high binary rate, one is constrained firstly to reduce the speed of transmission by replacing, for transmission purposes, binary data by multi-value symbols, and secondly to bring the characteristics of the link used by the transmission close to those of a gradual cut-off low-pass filter having a linear phase characteristic by such means as a shaping filter, modulation if so required, and correction of the distortion applied to the useful band by the link as set up for transmission.

The possibilities for correcting the distortion applied to the useful band by the link as set up for transmission depend on whether or not modulation has been used, and on the manner in which the binary data are replaced by multi-value symbols.

If there is no modulation, the correction is performed on the multi-value symbol. Whereas if there is modulation, the correction may be performed either before demodulation on the signal received from the transmission channel, or else after demodulation on the received multi-value symbols.

The binary data train to be transmitted is replaced either by a single string of real multi-value symbols sent at a lower rate, or by a string of pairs of real multi-value symbols sent at a lower rate and transmitted simultaneously via two independent channels in quadrature. The first option is to be found in particular in base band transmission systems or in systems which use single, or residual, sideband amplitude modulation, the second option is to be found in data transmission using amplitude modulation of two carriers in quadrature or similar systems such as four or eight state phase-jump transmission or combined phase and amplitude modulation. When correction is performed on the received symbols, it is performed, as the case may be, on one channel or on two parallel channels which were transmitted in quadrature. Given the use of two channels in quadrature, it is possible to reduce the second option to the first by considering each pair of real symbols to be the real and the imaginery parts of a single complex symbol, and by replacing real values in the first option calculations by complex values.

The distortion occurring in the useful band is constituted firstly by slowing varying amplitude distortion and group propagation delay distortion of the transmission channel, and secondly by more rapidly varying phase noise.

The amplitude and group propagation delay distortion of the transmission channel is corrected by means of a filter whose characteristics in the useful band are the inverse of those of the transmission channel, whereby an overall flat response in the useful band is obtained both for amplitude and for phase linearity. It is known to use self-adaptive linear equalizers for this purpose, the basic structure of the equalizers being a time-domain transversal filter as described by K. E. Kalmann, with coefficients being varied in such a manner as to minimize the error between the received symbols and their exact values or their estimated values. Such equalizers adapt automatically to the characteristics of a transmission channel during a learning period during which the data train is replaced by a test sequence known at the receiver end, and thereafter adaptation continues throughout data transmission in response to the slow variations in the characteristics of the transmission channel.

One particular self-adaptive linear equalizer of the type mentioned above, and used to process a single channel, (after demodulation if required) comprises a time-domain transversal filter whose multiply-tapped delay line has a unit time interval equal to the period separating two symbols at the transmitter end, and whose coefficients are adapted constantly by feed-back control loops tending to minimize the mean square error by a gradient algorithm defined by a linear equation of first order differences between real magnitudes.

The above-mentioned self-adaptive linear equalizer, originally intended for a single channel, has a complex version for use with two channels in quadrature. This complex version can be deduced by using the "complex/real" correspondance mentioned earlier, and may be decomposed into four time-domain transversal filters disposed in a trellis configuration, having the same sets of co-efficients in pairs and whose outputs are interconnected in pairs, one pair via a subtractor and the other via an adder. The feed-back loops which tend to minimize the mean-square error employ a gradient algorithm defined by the same linear equation of first order differences, but this time between complex magnitudes.

This compex version of the above-mentioned self-adaptive linear equalizer is also used for processing a single channel instead of using the version based on one transversal filter. To do this, the single channel is associated with a quadrature channel to which there is applied the Hilbert transform of the signal from the single channel.

The relative amplitude of phase noise increases with transmission rate. The level of phase noise on the telephone network is acceptable for conversation or for low rates of data transmission (1,200 bits/s), but it becomes problematic for data transmission at a high rate (9,600 bits/s). It may include the following diverse components:

frequency drift, stemming, for example, from modulation followed by demodulation using un-synchronized carriers;

a constant phase shift;

a periodic phase shift varying at mains frequency or at one of its harmonics, which is to be found in particular when using carrier cables; and a random phase shift at low frequency with respect to the bandwidth of the channel.

The phase noise can be considered as stemming from variations in the characteristics of the transmission channel. However, except for its DC and very low frequency components, phase noise cannot be eliminated by the linear self-adaptive equalizers used to correct amplitude and group propagation delay distortion in the transmission channel since they converge too slowly. Indeed, the above correction requires self-adaptive equalizers having a long impulse response with respect to that of the transmission channel which, taking the speed of transmission into account, requires the use of many coefficients. Now for stability reasons, the speed of a convergence of a linear self-adaptive equalizer is slower the larger the number of coefficients, and to a first approximation it is inversely proportional to the number of coefficients. For this reason, eliminating phase noise and more generally distortion attributable to rapid variation in the transmission channel must be done by means of additional correction circuits.

For example, at the receiver it is known to dispose a short, single coefficient linear self-adaptive equalizer between a long linear self-adaptive equalizer and a decision circuit which supplies an estimate of the transmitted symbols. It is also known at the receiver end of a digital data transmission system using amplitude modulation of two carriers in quadrature to dispose after the demodulator, a long self-adaptive linear equalizer followed by a self-adaptive complex phase shifter, the phase shift angle being adjusted in such a manner as to minimize the mean square error at its output using an algorithm defined, like that of the equalizer, by a linear equation of first order differences between complex magnitudes.

Both these arrangements are unsatisfactory since, in practice, frequency drifts are encountered which the additional correction circuits are incapable of following. Thus, improvements to the said arrangements have already been proposed; firstly by adding circuits for multiplying the coefficients of the long linear self-adaptive equalizer by the coefficient of the short self-adaptive equalizer in order to limit the amplitude of the corrections required of the short equalizer, however, this requires a large number of calculations to be performed; and secondly by disposing a second self-adaptive complex phase shifter in front of the long self-adaptive complex linear equalizer, likewise provided with a first order phase feed-back loop and having a phase shift angle adjusted to minimize the mean square error at its output, however, the improvement achieved is not sufficient, in particular when there is a large frequency drift.

The aim of the present invention is an improved correction of phase noise, and particularly that due to frequency drift, thereby improving the quality or the rate of a synchronous data transmission through a noisy medium such as the switched telephone network.

SUMMARY OF THE INVENTION

The present invention provides a method of compensating phase noise at the receiver end of a data transmission system operating at a modulation rate $1/\Delta T$ and comprising, at the receiver, a decision circuit for supplying an estimate of the originally transmitted symbols on the basis of the symbols actually received, wherein before application to the decision circuit, the received symbols are put into complex form with an in-phase component and a quadrature component, and are then multiplied by a complex coefficient defined by an equation having the form:

$$g_{k+1} = g_k - \sum_{j=0}^{+\infty} \lambda_j' e_{k-j} y_{k-j}^*$$

where:

$g_{k+1}$ is the complex coefficient by which the symbol $y_{k+1}$ received at instant $(k+1)\Delta T + T_0$ is multiplied;

$g_k$ is the complex coefficient by which the symbol $y_k$ received at instant $k\Delta T + T_0$ is multiplied;

$j$ is an index varying from 0 to $+\infty$;

$e_{k-j}$ is an error signal derived from the difference between the received symbol as applied to the decision circuit at instant $(k-j)\Delta T + T_0$ and the symbol estimated by the decision circuit;

$y_{k-j}^*$ is the complex conjugate of the symbol $y_{k-j}$ received at instant $(k-j)\Delta T + T_0$; and $\lambda_j'$ are real, non-zero, positive constants.

In a preferred embodiment, the received symbols are delivered by a long self-adaptive complex linear equalizer which corrects amplitude distortion and group propagation delay distortion due to the channel used by the transmission and whose self-adaptation is performed using an error signal derived from the differences between the symbols applied to the decision circuit and the estimates it makes thereof, the said differences being multiplied by the complex conjugates of the said complex coefficients.

The invention also provides apparatus for performing the above method.

BRIEF DESCRIPTION OF THE DRAWINGS

Other characteristics and advantages of the invention will appear in claims and from the following description of an embodiment given by way of example. The description is made with reference to the accompanying drawings in which:

FIG. 1 is a general circuit diagram of a synchronous data transmission system using amplitude modulation of two quadrature carriers;

FIG. 2 is a block diagram of an elementary linear equalizer;

FIG. 3 is a block diagram of an complex linear equalizer;

FIG. 4 shows the distortion correction circuit of FIG. 1 in greater detail; and

FIG. 5 is the circuit diagram of a phase noise reduction circuit useable with the distortion correction circuit of FIG. 4 and implementing the method in accordance with the invention.

DESCRIPTION OF THE PREFERRED EMBODIMENTS

An implementation of the method in accordance with the invention is described below in the context of a synchronous data transmission system using amplitude modulation of two carriers in quadrature (QAM).

The purpose of FIG. 1 is to situate the invention in such a system. It outlines a synchronous data transmission system using QAM type modulation.

In FIG. 1 there is a transmitter part 1 connected to a receiver part 2 by a transmission channel 3.

The transmitter part comprises a source of binary data 10 followed by a scrambler 11, a coder 12, a shaping filter 13, and a modulator 14.

The source 10 delivers the binary data to be transmitted.

The scrambler 11 sums modulo-2 the binary data from the source 10 with a pseudo-random binary sequence delivered at the same rate. As is well known, this has the effect of evening out the amplitude of the frequency spectrum of the binary data, thereby, inter alia facilitating recovery of the clock rate at the receiver end.

The coder 12 transforms the binary data into complex symbols which are delivered at a slower rate. Using 16 QAM modulation, one complex symbol can take one of four different amplitude levels and one of four different phase levels, and corresponds to a four-bit binary word, thereby making it possible to use a symbol rate or a speed of modulation which is four times less than that of the binary rate. The coder 12 has two outputs at which it applied the in-phase $S_i$ and quadrature $S_q$ symbol components in parallel.

The shaping filter 13, is in fact constituted by two filters in parallel operating on the symbol components and limiting their frequency spectrum in accordance with the criteria laid down by H. Nyquist. For example, these filters may have a raised cosine characteristic.

The modulator 14 is a modulator having two carriers in quadrature. It receives the two filtered components $S_i'$ and $S_q'$ and two versions in quadrature of the transmitter carrier $\omega_c$. At its output it delivers a signal e(t) constituted by the sum of the products of the symbol components multiplied by respective quadrature verions of the transmission carrier.

A band-pass filter, not shown, is often inserted between the modulator 14 and the transmission channel to limit the band of the transmitted signal to that of the transmission channel 3.

The receiver part 2 comprises a demodulator 20 followed by a distortion corrector 21, a decoder 22 and an unscrambler 23. It also includes a clock rate recovery circuit 24 with its input connected to the outputs of the demodulator 20 and its output connected to the distortion corrector 21, to the decoder 22, and to the unscrambler 23.

The demodulator 20, which is often preceded by a filter for limiting the band of the input signal to the receiver part, is a demodulator having two carriers in quadrature. It receives firstly, a signal r(t) from the transmission channel, and secondly two quadrature versions of a receiver carrier at the same angular frequency $\omega_c$ as the transmitter carrier. The receiver carrier is not synchronized on the transmitter carrier and presents a time-varying phase shift $\theta_D$ with respect thereto. On each of two outputs, the demodulator 20 supplies two demodulated signals: an in-phase signal x'(t) and a quadrature signal x"(t).

The clock rate recovery circuit 24 recovers the rate $h_1(t)$ at which the symbols are transmitted, also known as the modulation rate, which rate acts as the clock signal to the distortion corrector 21. The recovery circuit also delivers the binary data rate $h_2(t)$ by using multiplication. In the example under consideration, where the transmission shaping filter 13 has a raised cosine characteristic, the clock recovery circuit operates on the basis of a spectrum line at half the frequency of the modulation rate present in the demodulated signal.

The distortion corrector 21 which is described in greater detail below, acts on the demodulated signals x'(t) and x"(t) to eliminate: firstly both linear amplitude distortion and linear group propagation delay distortion introduced by the transmission channel, and secondly phase noise, particularly frequency drift and phase shift due to the fact that the transmitter and receiver carriers are not synchronized to each other.

The decoder 22 converts the symbols delivered thereto by the distortion corrector 21 into binary form. For this purpose it receives two clock signals, one at the symbol transmission rate and the other at the binary data transmission rate.

At the receiver end, the scrambler 23 reconstitutes the binary data delivered at the transmitter end by the data source 10.

Apart from the distortion corrector, the various circuits which have been listed above will not be described in detail since they do not form part of the present invention and have already been described in numerous articles. Reference could be made, for example on this topic to the book entitled "Principles of data communication" by R. W. Lucky, J. Salz and E. J. Weldon, published by McGraw-Hill in 1968.

Before describing the corrector (21 FIG. 1) it would be useful to recall the principal properties of such equalizers.

A complex linear equalizer is the two channels in quadrature version of the one channel elementary linear equalizer constituted by a time domain transversal filter using continuously controlled weighting coefficients. The elementary linear equalizer has been described in many articles, in particular, these by R. W. Lucky entitled "Automatic equalization for digital communication" and "Techniques for adaptive equalization of digital communication system" published in the B.S.T.J. (April 1965) 44 no. 4 pp 547-548 and (February 1966) 45 no. 2 pp 255-286. Such an equalizer is shown in FIG. 2 placed between a sampler 45, operating at a rate $1/\Delta T$ and delivering samples $x_{k-l}$, and a decision circuit 46 constituted by a threshold detector receiving samples $y_k$ of the equalized signal and providing estimates $\hat{a}_k$ of the corresponding symbols. It comprises:

a multiply-tapped delay line 47 having a unit tap interval $\Delta T$ and receiving samples $x_{k-l}$ to be equalized;

multipliers 48 which multiply the samples $x_{k-l}, \ldots, x_k, \ldots, x_{k+n}$ available at the input, the intermediate taps and at the output of the delay line 47 by corresponding weighting coefficients $h_k^l \ldots, h_k^0 \ldots, h_k^{-n}$;

a summing circuit 49 summing the weighted samples and supplying equalized signal samples $y_k$; and feed-back control loops, not shown, for determining the weighting coefficient.

The samples $y_k$ of the output signal are defined as a function of the samples $x_{k-l}, \ldots, x_k, \ldots, x_{k+n}$ of the input signal by the equation:

$$y_k = \sum_{j=-n}^{l} x_{k-j} h_k^j \tag{1}$$

This shows that the string of coefficients $h_k^j$ defines the discrete impulse response of the equalizer at instant $k\Delta T$. It is usual to represent this in reduced vector form by designating $\vec{X}_k$ as the single column matrix associated with the vector whose components are the input signal samples stored in the delay line 47 at instant $k\Delta T$, and whose transpose $\vec{X}_k^t$ is $$\vec{X}_k^t = [x_{k-l}, \ldots, x_k, \ldots, x_{k-n}]$$

and by designating $\vec{H}_k$ as the single column matrix associated with the vector whose components are the weighting coefficients of the same instant, and whose transpose $\vec{H}_k{}^t$ is:

$$\vec{H}_k{}^t = [h_k{}^l, \ldots, h_k{}^o, \ldots, h_k{}^{-n}]$$

The scalar quantity $y_k$ is:

$$y_k = \vec{H}_k{}^t \cdot \vec{X}_k \quad (2)$$

Self-adaptation consists in modifying the weighting coefficients over time, i.e. modifying the components of the vector $\vec{H}$ in such a manner as to reduce the differences between the equalized signal $y_k$ and the value $\hat{a}_k$ estimated for it by the decision circuit or its exact value $a_k$ when this is known at the receiver. To do this the vector H is updated at the rate $1/\Delta T$ using an algorithm defined by a linear equation of first order differences. One of the algorithms most used, known as the gradient algorithm, is defined by the vector equation:

$$\vec{H}_{k+1} = \vec{H}_k - \mu(y_k - \hat{a}_k)\vec{X}_k{}^* \quad (3)$$

As is conventional, the asterisk indicates a complex conjugate of the original term, $\mu$ is a positive constant representing an increment step size and $(y_k - a_k)$ is an error function.

For further details for these algorithms reference can be made to the article by C. Macchi, J. R. Jouannaud and O. Macchi entitled "Récepteurs adaptatifs pour transmissions de données" (Adaptive receivers for data transmissions) which appeared in the journal "Annales des télécommunications," 30, no. 9-10, 1975 pp 311-330.

A complex linear equalizer performs the same operation on a complex signal, i.e. on two independent real signals considered as the real and imaginary parts of a complex signal, as does the preceding linear equalizer on one real signal. The complex equalizer has two parallel inputs and two parallel outputs. It is shown in FIG. 3 preceded by a double sampler 50 and followed by a double decision circuit 51.

The double sampler operates at the rate $1/\Delta T$ and supplies samples $x_{k-l}{}'$ and $x_{k-l}{}''$ in parallel of two independent input signals.

The decision circuit 51 delivers parallel estimates $\hat{a}_k{}'$ and $\hat{a}_k{}''$ of the samples $y_k{}''$ delivered by the complex linear equalizer on its two parallel outputs.

The complex linear equalizer is constituted by four elementary linear equalizers 52, 53, 54, and 55 and by two summing circuits 56 and 57. The elementary equalizers 52, 53, 54, and 55 have identical delay lines. In respective pairs 52 and 55 or 53 and 54, they have the same sets of coefficients $\vec{H}'$ or $\vec{H}''$. The inputs to the elementary equalizers 52 and 53 are connected in parallel and receive the samples $x_{k-l}{}'$. Likewise the elementary equalizers 54 and 55 receive the samples $x_{k-l}{}''$. The outputs of the elementary equalizers 53 and 55 are connected by the summing circuit 57 which adds their output signals and supplies the samples $y_k{}''$ at its output. The summing circuit 56 has a plus-input connected to the elementary equalizer 52 and a minus-input connected to the elementary equalizer 54 and supplies the samples $y_k{}'$ at its output.

Repeating the notation used above for the elementary lineary equalizer, the output signal samples $y_k{}'$ and $y_k{}''$ may be expressed as follows:

$$y_k{}' = \vec{H}'_k{}^t \cdot \vec{X}_k{}' - \vec{H}''_k{}^t \cdot \vec{X}_k{}''$$
$$y_k{}'' = \vec{H}'_k{}^t \cdot \vec{X}_k{}'' + \vec{H}''_k{}^t \cdot \vec{X}_k{}'$$

where $\vec{X}_k{}'$ is by definition the vector whose components are $x_{k-l}{}', \ldots, x_k{}', \ldots, x_{k+n}{}'$, and $\vec{X}_k{}''$ is the vector whose components are $x_{k-l}{}'', \ldots, x_k{}'', \ldots, x_{k+n}{}''$.

Using complex notation:

$$y_k = y_k{}' + iy_k{}''$$
$$\vec{H}_k = \vec{H}_k{}' + i\vec{H}_k{}''$$
$$\vec{X}_k = \vec{X}_k{}' + i\vec{X}_k{}''$$

one obtains:

$$y_k = \vec{H}_k{}^t \cdot \vec{X}_k$$

This equation is the complex version of equation (2).

The real/complex analogy between the elementary linear equalizer and the complex linear equalizer holds for the algorithms used for self-adaptation of the coefficients. The gradient algorithm is defined by a linear equation of first order differences of the same form as equation (3), but this time the magnitudes are complex magnitudes.

$$\vec{H}_{k+1} = \vec{H}_k - \mu(y_k - \hat{a}_k)\vec{X}_k{}^* \quad (4)$$

where $\hat{a}_k$ is a complex term defined as:

$$\hat{a}_k = \hat{a}_k{}' + i\hat{a}_k{}''$$

which, as in the case of the elementary equalizer may be replaced by its exact value $a_k$ when this is known at the receiver; the asterisks indicate a complex conjugate of the base term.

For further details on complex self-adaptive linear equalizers, their algorithms for self-adaptation, and the justification of their use for equalizing two independent channels in quadrature whether obtained by amplitude modulation of two carriers in quadrature or by simultaneous processing of a real signal and its Hilbert transform, reference should be made to the above mentioned literature, and in particular to the article by C. Macchi, J. P. Jouannaud, and O. Macchi.

After this reminder we return to the distortion corrector 21 of FIG. 1, of which one embodiment is shown in FIG. 4 preceded by a double sampler 30 and followed by a double decision circuit 33. In the figure, in between the double sampler 30 and the double decision circuit 33, there can be seen a long self-adaptive linear equalizer 31, followed by a phase-noise reduction circuit 32.

The double digital sampler 30 receives demodulated signals x'(t) and x''(t) on two independent paths coming from the synchronous demodulator (20 FIG. 1) and delivers pairs of samples $x_{k-l}{}'$ and $x_{k-l}{}''$ at its output at a rate $1/\Delta T$ equal to the modulation rate $h_1(t)$ supplied by the clock recovery circuit (24 FIG. 1).

The long self-adaptive complex linear equalizer 31 corrects linear amplitude distortion and linear group propagation delay distortion introduced by the transmission channel, and at its output it delivers pairs of samples $y_k{}'$ and $y_k{}''$ of the equalized signals which, in the complex notation used above when recalling complex linear equalizers, may be written:

$$y_k = \vec{H}_k^t \cdot \vec{X}_k$$

The phase noise reducing circuit 32 multiplies the complex signal $y_k$ which it receives from the long self-adaptive complex linear equalizer 31 by a complex coefficient $g_k$. It delivers pairs of samples $v_k'$ and $v_k''$ which may be written:

$$v_k = v_k' + iv_k'' = g_k y_k = g_k \vec{H}_k^t \cdot \vec{X}_k$$

The decision circuit 33 is constituted by two threshold circuits 38 and 39 which supply the estimated components $\hat{a}_k'$ and $\hat{a}_k''$ of the complex transmitted signal in response to the components $v_k'$ and $v_k''$ of the complex signal as received and processed by the distortion correction circuit. Throughout the remainder of the description, these estimated components $\hat{a}_k'$ and $\hat{a}_k''$ may be replaced by the components $\hat{a}_k'$ and $\hat{a}_k''$ of the transmitted signal when these are known at the receiver, as actually occurs in practice during the setting-up period which precedes effective transmission of data.

The long self-adaptive complex linear equalizer 31 is represented in outline in FIG. 4 as a block 34 containing the four elementary equalizers which constitute it and a block 35 containing the feed-back control circuits which perform the self-adaptation of the coefficients of the elementary equalizers. The structure and the connections of the block 35 are determined by the usual techniques on the basis of the algorithm used for self-adaptation of the coefficients. The coefficients are adapted in such a manner as to minimize an error signal defined by the differences between the received symbols $v_k$ applied to the decision circuit 33 and the estimated symbols $a_k$ supplied therefrom. The algorithum may be the gradient algorithm relying on a linear equation of first order differences of the form:

$$\vec{H}_{k+1} = \vec{H}_k - \mu(v_k - \hat{a}_k)\vec{X}_k^*$$

or preferably of the form:

$$\vec{H}_{k+1} = \vec{H}_k - \mu(v_k - \hat{a}_k)g_k^* \vec{X}_k^*$$

In the latter case, implementation of the algorithm requires the input of the block 35 to be connected not only to the input and the output of the decision circuit 33 but also to the circuit 37 which supplies the complex coefficient $g_k$ of the phase noise reduction circuit 32. By multiplying the error signal by the complex conjugate of the coefficient $g_k$ it is possible to avoid taking into consideration the corrections applied by the phase noise reduction circuit 32 when adjusting the coefficients of the long self-adaptive complex linear equalizer 31, and thereby decorrelate the operation of the long self-adaptive complex linear equalizer 31 and the phase noise reduction circuit 32.

The last equation can also be put in the form:

$$\vec{H}_{k+1} = \vec{H}_k - \mu(y_k - \hat{a}_k g_k^*)\vec{X}_k^*$$

provided $|g_k|$ is near unity, which leads to a different embodiment of the block 35 by replacing its input signal $v_k$ with the signal $y_k$. The phase noise reduction circuit 32 is constituted by a complex multiplier 36 and a feed-back control circuit 37 which provides its complex coefficient $g_k$ by using an algorithm defined by a linear difference equation of the form:

$$g_{k+1} = g_k - \sum_{j=0}^{+\infty} \lambda_j e_{k-j} y_{k-j}^* \quad (5)$$

where $$e_{k-j} = v_{k-j} - \hat{a}_{k-j}$$

and in which the terms $\lambda_j$ are real, non-zero positive constants.

The phase noise to be corrected by the phase noise reduction circuit 32 may be expressed by the equation:

$$\theta_k = \theta_0 = 2\pi f_d k \Delta T + \alpha \sin(2\pi f_g k \Delta T + \beta)$$

where:

$\theta_o$ is a constant phase shift;
$f_d$ is the frequency drift;
$2\alpha$ is the peak-to-peak amplitude of the phase jitter;
$f_g$ is the frequency of the phase jitter; and
$\beta$ is the phase at the origin of the phase jitter.

For the feed-back control means generating the complex coefficient $g_k$ in the phase noise reduction circuit 32, the phase shift constant $\theta_o$ is a position error, the frequency drift is a speed error and the phase jitter is an error in respond a harmonic input signal. Thus, to cancel the frequency drift it is necessary for the feed-back control to be at least class 2, and to cancel the phase jitter it is necessary that its open loop gain should be large at the jitter frequency. This feed-back control is defined by a linear equation using at least second order differences of the form $$g_{k+1} = g_k - \sum_{j=0}^{+\infty} \lambda_j \left( g_{k-j} - \frac{1}{m_{k-j}} \right)$$

in which the coefficients $\lambda_j$ are real, non-zero, positive constants and where the term $1/m_{k-j}$ is the precise value of the complex coefficient by which the received symbol $y_{k-j}$ ought to have been multiplied in order to have no error at the input to the decision circuit:

$$y_{k-j} = \hat{a}_{k-j} m_{k-j}.$$

The error in the value of the complex coefficient may be written, once multiplied by the received symbol $y_k$ as:

$$\left( g_k - \frac{1}{m_k} \right) y_k = v_k - a_k = e_k$$

whence $$\left( g_k - \frac{1}{m_k} \right) = \frac{e_k}{y_k} = \frac{1}{|y_k|^2} e_k y_k^*$$

The terms with $1/|y_k|^2$ may be replaced by terms with $1/|a_k|^2$ since the error in the modulus of the received symbols at the output of the long self-adaptive complex linear equalizer is small with respect to the phase error. The terms in $1/|a_k|^2$ vary much more rapidly than the error $(g_k - 1/m_k)$.

Given the scrambling used at the transmission end, these terms tend, over a short time interval with respect to the speed or variation in the error ($g_k - 1/m_k$), towards a constant average value which may be taken into account in the $\lambda$ coefficients which then become $\lambda'$ with $$g_{k+1} = g_k - \sum_{j=0}^{+\infty} \lambda_j' e_{k-j} y^*_{k-j}$$

preferably an algorithm of the following form is adopted $$g_{k+1} = g_k - \gamma_1 e_k y_k^* - \gamma_2 \sum_{j=0}^{+\infty} e_{k-j} y^*_{k-j}$$

which is the same as substituting $$\lambda_0' = \gamma_1 + \gamma_2, \lambda_j' = \gamma_2 \text{ for } j \geq 1$$

The various coefficients $\gamma_1$, $\gamma_2$, are conventionally determined in feed-back control theory by working on the Z transforms of the linear difference equations $$y_{k+1} = y_k - \gamma_1 x_k - \gamma_2 \sum_{j=0}^{+\infty} x_{k-j}$$

so as to obtain phase control whose behaviour is effectively second order (class 2) and whose open loop gain is high at the jitter frequency.

FIG. 5 is a detailed example of the phase noise reducing circuit shown in FIG. 4. It comprises a complex multiplier 36 with two complex inputs and constituted by four elementary multipliers 100, 101, 102, and 103 and two summing circuits 104 and 105, each having two inputs, and one of which, 104, has one of its inputs as its subtractive input. On a first input this complex multiplier receives the complex signal $y_k' + iy_k''$ from the long self-adaptive complex linear equalizer (31 FIG. 4) and on its second input it receives the complex coefficient $g_k' + ig_k''$ and at its output it delivers the complex signal:

$$v_k' + iv_k'' = (y_k' + iy_k'')(g_k' + ig_k'')$$

The real part $g_k'$ of the complex coefficient is delivered by a feed-back control circuit 40. This circuit includes two input multipliers 106, 107 with their outputs connected via a summing circuit 108 to a digital filter 41 leading to a digital integration loop 42 which delivers the signal $g_k'$.

The multiplier 106 has two inputs, one connected to that an input of the phase noise reduction circuit at which the signal $y_k''$ is available and the other connected to the output of a summing circuit 110 having two inputs, one an additive input connected to that input of the threshold circuit 39 of the decision circuit (33 FIG. 4) at which the signal $V_k''$ is available, and the other being a subtractive input connected to that output of the same threshold circuit 39 at which the component $â_k''$ of the estimated symbol is available. Its output signal is:

$$(v_k'' - â_k'')y_k''$$

The multiplier 107 has two inputs, one connected that input of the phase noise reduction circuit at which the signal $y_k'$ is available, the other connected to the output of a summing circuit 111 having two inputs, one being an additive input connected to that input of the threshold circuit 38 of the decision circuit (33 FIG. 4) at which the signal $v_k'$ is available, and the other being an subtractive input connected to that output of the same threshold circuit 38, at which the component $â_k'$ of the estimated signal is available. Its output signal is equal to:

$$(v_k' - â_k')y_k'$$

The summing circuit 108 has two additive inputs connected to the respective outputs of the multipliers 106 and 107. Its output signal is equal to:

$$(v_k'' - â_k'')y_k'' + (v_k' - â_k')y_k'$$

which may be written as $$Re(v_k - â_k)y_k^*$$

or else $$Re(e_k y_k^*)$$

The digital filter 41 has two parallel branches interconnected at its output by a summing circuit 109. One of the branches includes an inverting amplifier 112 which multiplies the signal passing therethrough by a coefficient $-\gamma_1$. The other branch comprises a digital integration loop constituted by a summing circuit 113 and a delay circuit 114 which introduces a delay equal to $\Delta T$ corresponding to the time interval which separates two symbols at transmission, followed by an inverting amplifier 115 which multiplies the signal passing therethrough by a coefficient $-\gamma_2$. The signal delivered at its output is equal to:

$$-\gamma_1 Re(e_k y_k^*) - \gamma_2 \sum_{j=0}^{+\infty} Re(e_{k-j} y^*_{k-j})$$

The digital integration loop 42 comprises a summing circuit 116 and a delay circuit 117 which introduces a delay $\Delta T$. At the output of the summing circuit it delivers a signal equal to:

$$g_{k+1}' = g_k' - \gamma_1 Re(e_k y_k^*) - \gamma_2 \sum_{j=0}^{+\infty} Re(e_{k-j} y^*_{k-j}) \quad (6)$$

The imaginary part $g_k''$ of the complex coefficient of the phase noise reduction circuit is generated by a feed-back control circuit 50 whose structure is similar to that of the feed-back control circuit 40. The circuit 50 comprises two input multipliers 126, 127 whose outputs are connected via a summing circuit 128 to a digital filter 51 which leads to a digital integration loop 52 that delivers the signal $g_k''$.

The multiplier 126 has two inputs, one connected to that input of the phase noise reduction circuit at which the signal $y_k''$ is available, and the other connected to that output of the summing circuit 111 at which the signal $v_k' - â_k'$ is available. Its output signal is equal to:

$$(v_k' - â_k')y_k''$$

The multiplier 127 has two inputs, one connected to that input of the phase noise reduction circuit at which the signal $y_k'$ is available, and the other connected to that output of the summing circuit 110 at which the signal $v_k'' - â_k''$ is available. Its output signal is equal to:

$(v_k''-\hat{a}_k'')y_k'$

The summing circuit 128 has two inputs, one of them is an additive input connected to the output of the multiplier 127, and the other an subtractive input connected to the output of the multiplier 126. It delivers an output signal equal to:

$(v_k''-\hat{a}_k)y_k' - (v_k'-\hat{a}_k')y_k''$ which may be written $Im[(v_k-\hat{a}_k)y_k^*]$ or else $Im(e_k y_k^*)$ The digital filter 51 has the same structure as the digital filter 41 and its output signal is equal to:

$$-\gamma_1 Im(e_k y_k^*) - \gamma_2 \sum_{j=0}^{+\infty} Im(e_{k-j} y_{k-j}^*)$$

The digital integration loop 52 is identical to the digital integration loop 42. At the output of its summing circuit it delivers a signal $g_{k+1}''$ defined by the equation:

$$g_{k+1}'' = g_k'' - \gamma_1 Im(e_k y_k^*) - \gamma_2 \sum_{j=0}^{+\infty} Im(e_{k-j} y_{k-j}^*) \quad (7)$$

The equations (6) and (7) can be re-grouped into a single equation defining the complex coefficient $g_{k+1}$, where:

$$g_{k+1} = g_k - \gamma_1 e_k y_k^* - \gamma_2 \sum_{j=0}^{+\infty} e_{k-j} y_{k-j}^*$$

The embodiment of the phase noise reduction circuit which has just been described, has been described in the context of data transmission using amplitude modulation of two carriers in quadrature and using two independent quadrature channels for transmission. However, it could be used in single channel data transmission, with the equations remaining appropriate provided that firstly, the Hilbert transform of the signal in the single channel is generated and is then taken to be the signal from the quadrature channel, followed by taking the Hilbert transform again of the quadrature channel signal after processing and subtracting it from the single channel signal, and secondly the imaginary part $\hat{a}_k''$ of the estimated symbols is removed from any equations in which they occur.

We claim:

1. A method of compensating phase noise at the receiver end of a data transmission system operating at a modulation rate $1/\Delta T$ and comprising, at the receiver, a decision circuit for supplying an estimate of the originally transmitted symbols on the basis of the symbols actually received, wherein before application to the decision circuit, the received symbols are put into complex form with an in-phase component and a quadrature component, and are then multiplied by a complex coefficient defined by an equation having the form:

$$g_{k+1} = g_k - \sum_{j=0}^{+\infty} \lambda_j' e_{k-j} y_{k-j}^*$$

where:
- $g_{k+1}$ is the complex coefficient by which the symbol $y_{k+1}$ received at instant $(k+1)\Delta T + T_0$ is multiplied;
- $g_k$ is the complex coefficient by which the symbol $y_k$ received at instant $k\Delta T + T_0$ is multiplied;
- $j$ is an index varying from 0 to $+\infty$;
- $e_{k-j}$ is an error signal derived from the difference between the received symbol as applied to the decision circuit at instant $(k-j)\Delta T + T_0$ and the symbol estimated by the decision circuit;
- $y_{k-j}^*$ is the complex conjugate of the symbol $y_{k-j}$ received at instant $(k-j)\Delta T + T_0$; and
- $\lambda_j'$ are real, non-zero, positive constants.

2. A method according to claim 1, wherein the said complex coefficient is defined by the equation:

$$g_{k+1} = g_k - \gamma_1 e_k y_k^* - \gamma_2 \sum_{j=0}^{+\infty} e_{k-j} y_{k-j}^*$$

where $\gamma_1$ and $\gamma_2$ are real non-zero constants.

3. A method according to claim 1 for data transmission including, at the receiver end before the decision circuit, a long self-adaptive complex linear equalizer for correcting linear amplitude distortion and linear group propagation delay distortion due to the channel used by the transmission, wherein the coefficients of the long self-adaptive complex linear equalizer are modified using an error signal derived from the differences between the symbols applied to the decision circuit and the estimates it makes thereof, the said differences being multiplied by the complex conjugates of the said complex coefficients.

4. Apparatus for compensating phase noise at the receiver end of a data transmission system for transmitting multi value symbols at a modulation rate $1/\Delta T$, the system including, at the receiver end, a decision circuit for supplying an estimate of the originally transmitted symbols on the basis of the symbols actually received, and means prior to the decision circuit for putting the received symbols into complex form $y_k$ with an in-phase component $y_k'$ and a quadrature component $y_k''$, said apparatus for compensating phase noise comprising means for generating a complex phase noise correction coefficient $g_k$ and means for performing complex multiplication of the received symbol in complex form times the complex correction coefficient to obtain a phase noise compensated symbol in complex form for application to the decision circuit, the complex phase noise correction coefficient $g_k$ being generated by said means according to the equation:

$$g_{k+1} = g_k - \sum_{j=0}^{+\infty} \lambda_j' e_{k-j} y_{k-j}^*$$

where:
- $g_{k+1}$ is the complex coefficient by which the symbol $y_{k+1}$ received at instant $(k+1)\Delta T + T_0$ is multiplied;
- $g_k$ is the complex coefficient by which the symbol $y_k$ received at instant $k\Delta T + T_0$ is multiplied;
- $j/e$ is an index varying from 0 to $+\infty$;

k−j is an error signal derived from the difference between the received symbol as applied to the decision circuit at instant $(k−j)\Delta T+T_0$ and the symbol estimated by the decision circuit; $y_{k−j}^*$ is the complex conjugate of the symbol $y_{k−j}$ received at instant $(k−j)\Delta T+T_0$; and $\lambda_j'$ are real, non-zero, positive constants.

5. Apparatus for compensating phase noise according to claim 4, comprising:

means for generating the in-phase component $g_k'$ and the quadrature component $g_k''$ of the complex phase noise correction coefficient $g_k$, and a first complex multiplier for multiplying each of the symbol components $y_k'$ and $y_k''$ by each of the coefficient components $g_k'$ and $g_k''$ and then subtracting the quadrature times quadrature product from the in-phase times in-phase product to obtain a phase noise compensated in-phase symbol component $v_k'$ for application to the decision circuit, and summing both of the in-phase times quadrature products to obtain a phase noise compensated quadrature symbol component $v_k''$ for application to the decision circuit, the means for generating the complex phase noise correction coefficient comprising:

means for obtaining an in-phase error component and a quadrature error component by subtracting the in-phase component $â_k'$ and the quadrature component $â_k''$ of the value of the received symbol as estimated by the decision circuit from the corresponding in-phase and quadrature components $v_k'$ and $v_k''$ applied thereto by the first complex multiplier;

a second complex multiplier for multiplying each of the received symbol components $y_k'$ and $y_k''$ by each of the error components and then summing the quadrature times quadrature product with the in-phase times in-phase product to obtain an in-phase intermediate signal from which the in-phase component $g_k'$ of the phase noise correction coefficient is generated, and subtracting the quadrature received symbol component $y_k''$ times the in-phase error component product from the in-phase received symbol component $y_k'$ times the quadrature error component product to obtain a quadrature intermediate signal from which the quadrature component $g_k''$ of the phase noise correction coefficient is generated; and first and second, like component generators for generating the in-phase and quadrature components of the phase noise correction co-efficient $g_k$ on the basis of respective ones of said intermediate signals, each of said generators comprising a filter followed by a first integrator, the filter having two branches both receiving the intermediate signal, one branch multiplying the signal by a first constant coefficient $−\gamma_1$, and the other comprising a second integrator followed by a multiplier arranged to multiply the integral by a second constant coefficient $−\gamma_2$, the signals available from the two branches of the filter being summed to provide a filter output signal which is applied as an input signal to the first integrator, whose output signal constitutes a respective one of the components of the phase noise correction coefficient.

6. Apparatus according to claim 5, wherein the first and second integrators are digital integrators having a feed back loop with a delay $\Delta T$.

* * * * *